United States Patent [19]

Ishikawa et al.

[11] Patent Number: 4,902,157
[45] Date of Patent: Feb. 20, 1990

[54] SEALING STRUCTURE FOR A BALL JOINT OF A WIPER LINK MECHANISM

[75] Inventors: Masaru Ishikawa; Yuichi Itoh, both of Kamakura, Japan

[73] Assignee: Jidosha Denki Kogyo Kabushiki Kaisha, Kanagawa, Japan

[21] Appl. No.: 98,450

[22] Filed: Sep. 18, 1987

[30] Foreign Application Priority Data

Sep. 19, 1986 [JP] Japan .................. 61-219418

[51] Int. Cl.$^4$ .......... F16C 11/06; F16J 15/52
[52] U.S. Cl. .................. 403/50; 277/212 FB; 403/76; 403/134; 464/173
[58] Field of Search .......... 277/212 FB; 74/18.1; 464/175, 173; 403/50, 76, 134; 285/322, 323

[56] References Cited

U.S. PATENT DOCUMENTS

| | | | |
|---|---|---|---|
| 2,417,250 | 2/1947 | Harvey | 285/322 X |
| 2,885,248 | 5/1959 | White | 403/134 X |
| 3,166,333 | 1/1965 | Henley | 277/212 FB X |
| 3,248,955 | 5/1966 | Templeton | 403/50 |
| 3,284,115 | 11/1966 | Schmidt | 74/18.1 |
| 3,404,909 | 10/1968 | Gottschald | 277/212 FB X |
| 3,430,995 | 3/1969 | Herbenar et al. | 277/212 FB |
| 3,451,700 | 6/1969 | Smith | 277/212 FB X |
| 4,003,666 | 1/1977 | Gaines et al. | 277/212 FB X |
| 4,419,027 | 12/1983 | Trudfau | 403/134 |
| 4,527,803 | 7/1985 | Rose | 74/18.1 X |

FOREIGN PATENT DOCUMENTS

| | | | |
|---|---|---|---|
| 720283 | 4/1942 | Fed. Rep. of Germany | 403/134 |
| 1248386 | 8/1967 | Fed. Rep. of Germany | 277/212 FB |
| 24726 | 8/1970 | Japan | 277/212 FB |
| 45-34931 | 6/1973 | Japan . | |
| 61-141156 | 9/1986 | Japan . | |
| 522060 | 6/1940 | United Kingdom | 403/76 |
| 910069 | 11/1962 | United Kingdom | 277/212 FB |
| 1583673 | 1/1981 | United Kingdom | 277/212 FB |

Primary Examiner—Allan N. Shoap
Attorney, Agent, or Firm—Sughrue, Mion, Zinn, Macpeak & Seas

[57] ABSTRACT

A sealing structure for a ball joint of a wiper link mechanism is provided with a boot. A boot-engaging part is formed on an outer periphery adjacent an opening of said ball retainer and a retainer-engaging part is formed at the end of the boot which includes a flexible part. The boot can seal the opening of the ball retainer in the limited space between the plate-shaped link arm and the plate-shaped link connecting rod in the state in which the ball pin is coupled to the ball retainer. It is able to prevent water, mud or the like from entering into the spherical hollow of the ball retainer even if the link arm and the link connected rod are inclined to each other.

4 Claims, 3 Drawing Sheets

SEALING STRUCTURE FOR A BALL JOINT OF A WIPER LINK MECHANISM

BACKGROUND OF THE INVENTION

This invention relates to a wiper link mechanism oscillating a wiper blade which wipes off raindrops, dust and the like existing, for example, on a surface of a front windshield of an automobile, and especially, relates to a sealing structure of a ball joint for a wiper link mechanism which connects a link arm with a link connecting rod of the wiper link mechanism.

A ball joint having a normally used structure for an automobile is assembled to, for example, a steering shaft, a propeller shaft, a drive shaft and the like. A ball joint of this type for an automobile has a relatively large length in the direction of the axis and lip-parts of the sealing member for the ball joint do not easily cause interference with other parts or members.

On the contrary, in case of the ball joint for a wiper link mechanism, the space between the plate-shaped link arm and the plate-shaped link connected rod is very narrow, whereby the lip-parts of the sealing member adopted between the link arm and the link connecting rod easily cause interference with other parts or members.

Therefore, it is necessary to introduce a peculiar sealing structure for the ball joint of the wiper link mechanism.

A prior art sealing structure for a ball joint for a wiper link mechanism, for example, is shown in FIG. 6.

A ball joint 101 shown in FIG. 6 is composed of a ball pin 103 and a ball retainer 106. The ball pin 103 is fixed to a link arm 102. The ball retainer 106 connected to a link connecting rod 104 is provided with a spherical hollow 105 for forming a spherical pair with said ball pin 103.

The ball pin 103 is inserted into said spherical hollow 105 of said ball retainer 106 through an opening 107 provided at the lower part of said spherical hollow 105 in FIG. 6, whereby said ball pin 103 coupled with said ball retainer 106 performs a free power-transmission.

A boot 112 which is formed from an elastic body is inserted between the under surface of the ball retainer 106 and upper surface of the link arm 102 in FIG. 6.

In the ball joint 101 having the above mentioned structure, said boot 112 prevents the penetrating of water, mud or the like into the spherical hollow 105 from the lower part of said ball retainer 106.

However, in the above mentioned ball joint 101, it is very rare to transmit the power at the state in which the link arm 102 and the link connecting rod 104 are kept in parallel to each other as shown in FIG. 7. Generally, the power is transmitted at the state in which the link arm 112 or the link connected rod 104 is tilted. When the link arm 102 or the link connecting rod 104 transmits the power in an inclined position, the boot 112 cannot be deformed in response to the movement of said link arm 102 and the link connecting rod 104. Therefore, sometimes a space is formed between the ball retainer 106 and the boot 112 or between the link arm 102 and the boot 112, and then, water, mud and the like may enter into the spherical hollow 105 of the ball retainer 106 through said space.

This causes a problem in that the ball pin 103 and the spherical hollow 105 of the ball retainer 106 wear away remarkably. Thereby the life of the ball joint 101 is reduced and smooth movement of the ball joint 101 is prevented. On the other hand, it is a possible problem that the ball pin 103 pops out of the ball retainer 106.

SUMMARY OF THE INVENTION

It is an object of the invention to solve the above mentioned problem and to provide a sealing structure of a ball joint which is above to prevent the penetrating of water, mud or the like into the spherical hollow of the ball retainer when the ball joint transmits power in the state in which the link arm or a link connecting rod is tilted.

In order to accomplish the above mentioned object, according to this invention, the construction of a sealing structure for a ball joint of a wiper link mechanism is composed of a ball pin and a ball retainer, said ball pin is fixed to a link arm of the wiper link mechanism and said ball retainer is connected to a link connecting rod of the wiper link mechanism and said ball retainer is provided with a spherical hollow for forming a spherical pair with said ball pin, which the ball joint combines said ball pin and said ball retainer for performing free power transmission, characterized in that a boot-engaging part having a looped shape is provided at on the outer periphery of the open side of said spherical hollow of said ball retainer, said boot engaging part of said ball retainer is engaged with a retainer-engaging part of a boot which is formed as an elastic body provided with a flexible part being capable of free transformation, said flexible part of said boot being disposed between the ball retainer and the link arm for sealing the opening of said ball retainer.

BRIEF DESCRIPTION OF THE DRAWINGS

The invention will be described with reference to the accompanying drawings, wherein.

DESCRIPTION OF THE PREFERRED EMBODIMENTS

Figure 1:
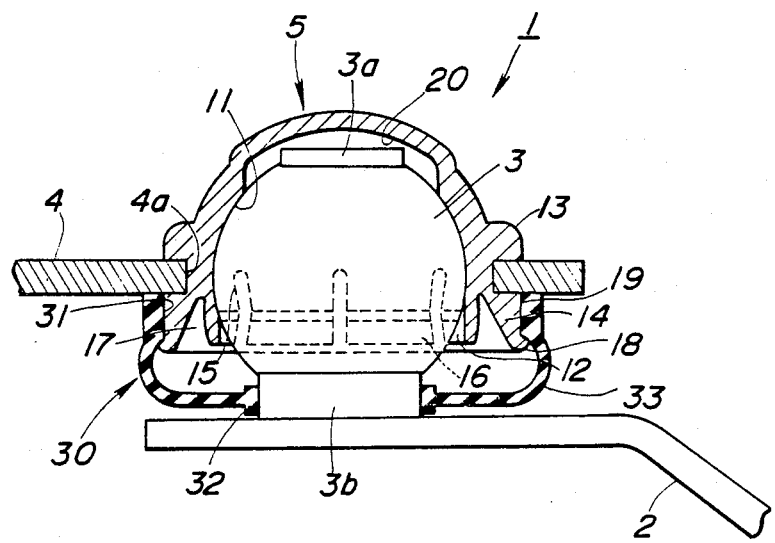
FIG. 1 is a sectional view of the first embodiment of a sealing structure of a ball joint for a wiper link mechanism according to this invention.
Figure 2:
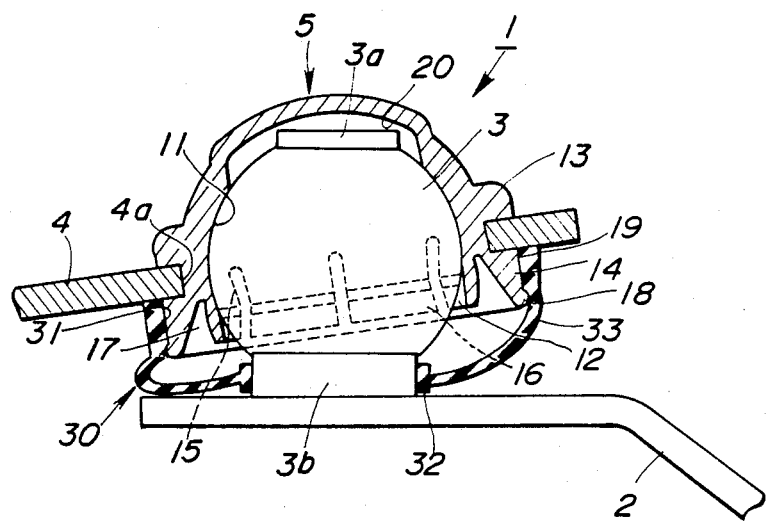
FIG. 2 and FIG. 3 are sectional views of operating conditions of the ball joint in the FIG. 1.
Figure 3:
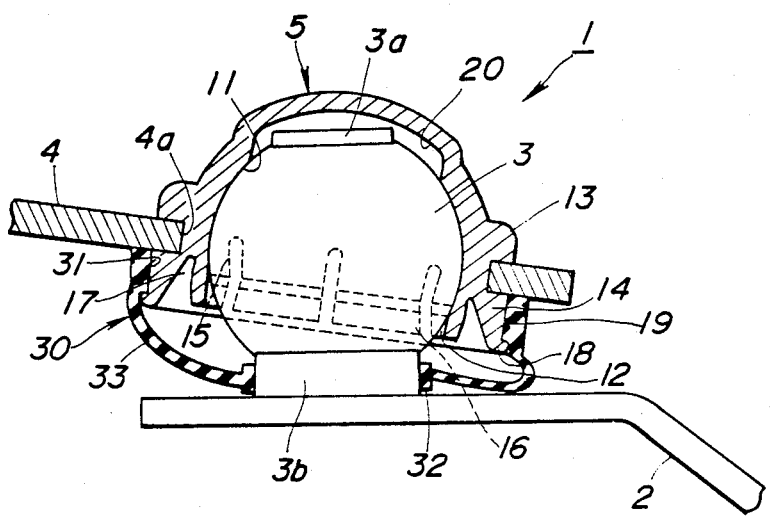

FIG. 1, FIG. 2 and FIG. 3 show the first embodiment of a sealing structure of a ball joint for a wiper link mechanism according to this invention.

In FIG. 1, numeral 1 is a ball joint for a wiper link mechanism of this invention.

This ball joint 1 for the wiper link mechanism is composed of a ball pin 3 and a ball retainer 5. Said ball pin 3 is fixed to a link arm 2 of the wiper link. The ball retainer 5 is connected to a link connecting rod 4 of the wiper link. The ball joint 1 freely transmits the power of the link arm 2 to the link connecting rod 4 by the coupling of the ball pin 3 and the ball retainer 5.

The ball retainer 5 is secured in a hole 4a formed at an end of the link connecting rod 4 by insertion. The ball retainer 5 comprises a spherical hollow 11 complimentary to said ball pin 3, an opening 12 formed as an entrance to couple said ball pin 3 at the lower part of said spherical hollow 11, and an annular brim 13 and a skirt portion 14 holding said link connecting rod 4.

A rim portion 16 is provided with a plurality of cut-out portion 15 (in this embodiment, the number of cut-out portions 15 is six) at said opening 12 in the coupling direction of said ball pin 3. The ball retainer 5 is provided with an annular groove 17 between said skirt portion 14 and said rim portion 16. When said ball pin 3 is inserted into the opening 12 which is having an inner diameter smaller than the diameter of said ball pin 3, said rim portion 16 is bent toward the annular groove 17, so as to facilitate the coupling of the ball pin 3 with the ball retainer 5.

Said skirt portion 14 has a peripheral projection 18 at the end of said skirt portion 14. A portion of said projection 18 below the under surface of said link connecting rod 4 is a boot-engaging part 19 engaged with an annular projection 31 of a boot 30 described later. The end of said peripheral portion 19 is rounded off into a spherical surface to make it easy to engage with the annular projection 31 of the boot 30.

The top of said spherical hollow 11 has an inclination-controlling hollow 20 for controlling the tilt angle of said ball retainer 5 by engaging with the projection 3a formed on a head of said ball pin 3.

A boot 30 is made of rubber having elasticity. The boot 30 is provided with the annular projection 31, an annular rib-like part 32 and a flexible part 33. Said annular projection 31 is a retainer-engaging part engaging with said boot-engaging part 19 of said ball retainer 5. Said annular rib-like part 32 is fitted to the cylindrical part 3b of said ball pin 3 so as to slide on it. Said flexible part 33 formed into a thin skin and connects said annular projection 31 to said rib-like part 32. At the state in which said ball pin 3 and said ball retainer 5 are connected, said flexible part 33 is disposed between the ball retainer 5 and the link connecting rod 4 and seals the spherical hollow 11 of said ball retainer 5.

When said ball joint 1 is assembled by coupling said ball retainer 5 with the ball pin 3, said rib-like part 32 of said boot 30 is first fitted to the cylindrical part 3b of said ball pin 3. Secondly, said ball pin 3 is inserted into the opening 12 of said ball retainer 5. At this time, since the rim portion 16 of the opening 12 can be bent to the outside, even if the diameter of said ball pin 3 is larger than the diameter of said opening 12 before bending, said ball pin 3 is able to pass through the opening 12. Hence, said ball pin 3 is coupled to the spherical hollow 11 of said ball retainer 5 through the spherical connection.

The annular projection 31 of said boot 30 is engaged with the boot-engaging part 19 of the skirt 14 of said ball retainer 5. At this time, the annular projection 31 of said boot 30 adheres to the boot-engaging part 19 of said ball retainer 5 by the elasticity of said boot 30, and the rib-like part 32 of said boot 30 is fitted to said axis part 3b so as to slide on it.

In such a situation of the ball joint 1, the boot 30 can follow the movement of the said ball joint 1 so as not to obstruct it even if the link connecting rod 4 is inclined as shown in FIGS. 2 and FIG. 3. Namely, the flexible part 33 of said boot 30 is deformed in response to the movement of said link connecting rod 4 while the annular projection 31 and the rib-like part 32 are never deformed and remain in their state.

Accordingly, since said boot 30 seals said opening 12 of said ball retainer 5, an invasion of water, mud or the like into the ball retainer 5 can be prevented.

Figure 4:
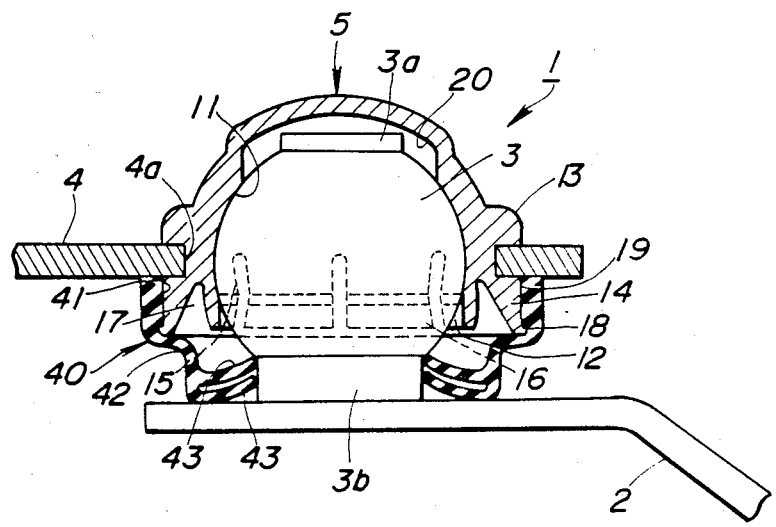
FIG. 4 and FIG. 5 are sectional views of the second and third embodiments of a sealing structure of a ball joint for a wiper link mechanism according to this invention, respectively.

Next, FIG. 4 shows another preferred embodiment of this invention.

A boot 40 is made from a rubber material which is formed as an elastic body. Said boot 40 is provided with an annular projection 41 engaged with said boot-engaging part 19 of said ball retainer 5 and a thin, deformable, flexible part 42 is connected with said annular projection 41.

Two layers of annular tongue-like pieces 43, fitted to the shank 3b of said ball pin 3 are provided at the inner periphery of the end of said flexible part 42.

When the annular projection 41 of said boot 40 is engaged with the boot-engaging part 19 of the ball retainer 5 and the annular tongue-like pieces 43, 43 are fitted to the shank part 3b of the ball pin 3, the flexible part 42 lies between said link arm 2 and said ball retainer 5 and seals the opening 12 of said ball retainer 5. At this time, since said boot is made from elastic materials, said annular projection 41 adheres to the boot-engaging part 19 of said ball retainer 5, and said annular tongue-like pieces 43, 43 are fitted to the shank part 3b of said ball pin 3 so as to slide on it.

Figure 5:
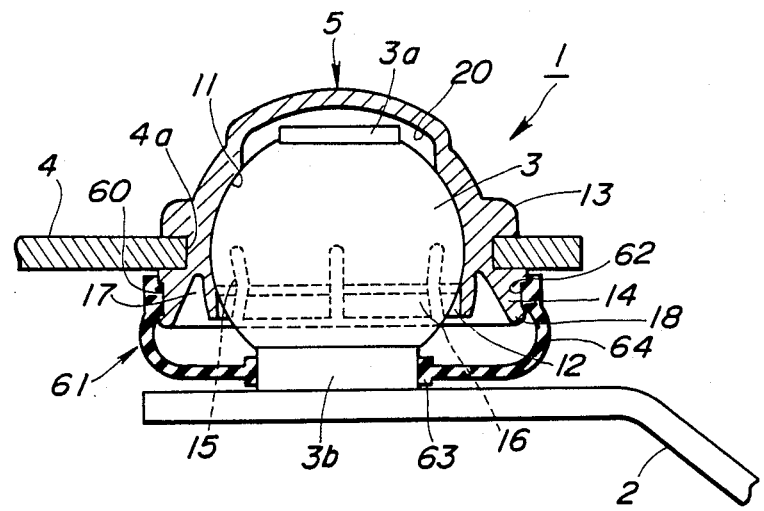
Figure 6:
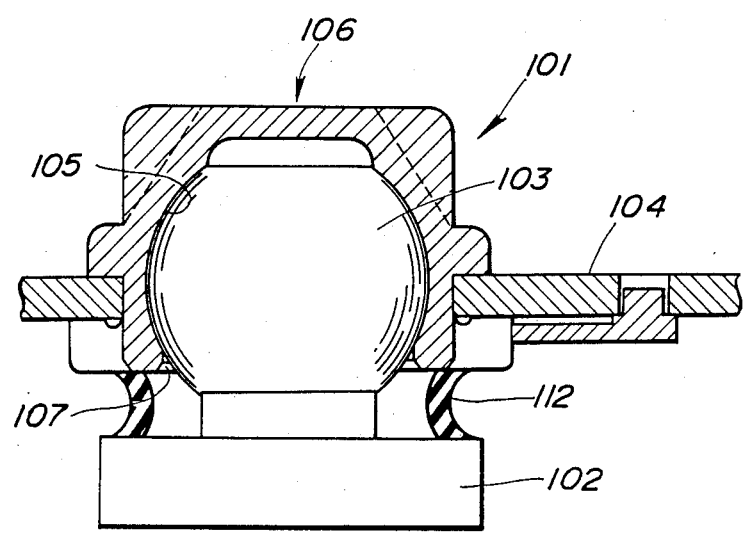
FIG. 6 is a sectional view of a sealing structure of a ball joint for a wiper link mechanism in the prior art.

Next, FIG. 5 shows another preferred embodiment of this invention.

In this preferred embodiment, the outer periphery of the skirt 14 of said ball retainer 5 is provided with a peripheral engaging groove 60 as a boot-engaging part. This engaging groove 60 is engaged with an annular projection 62 on boot 61 having a width the same as that of the engaging groove 60. An annular rib part 63 of said boot 61 is fitted to the shank 3b of said ball pin 3 so as to slide on it. A flexible part 64 of said boot 61 connects said annular projection 62 and the rib part 63.

Accordingly, said flexible part 64 seals the opening 12 of said ball retainer 5 lying between said ball retainer 5 and said link arm 2.

Further, in the preferred embodiments described above, it is explained that said ball retainer 5 is connected to said link connecting rod 4 by insertion. However, said ball retainer may be secured to said link connecting rod by rotational equipment.

As explained above, by using the sealing structure for a ball joint of a wiper link mechanism according to this invention, when the power is transmitted in a state in which said link connecting rod or the link arm is inclined, since said annular projection of said boot adheres to said boot-engaging part of said ball retainer by the elasticity of the boot itself and said flexible part of said boot is deformed in response to the inclination of said link connecting rod or said link arm, it is always possible to seal the opening of said ball retainer.

Accordingly, an excellent effect is obtained since it is able to prevent water, mud or the like from entering into the spherical hollow through the opening of the ball retainer.

What is claimed is:

1. A sealed ball joint assembly for a wiper link mechanism comprising a spherical ball with a cylindrical shank connected to a link arm and a ball retainer connected to a connecting rod, said ball retainer having flange means surrounding an opening for receiving said ball in said ball retainer and a skirt with a peripheral projection on a free end of the retainer surrounding said flange means, said retainer, skirt and flange means being of one piece construction with a substantially V-shaped groove between said skirt and said flange means and an annular sealing member extending between said retainer and said shank and having an annular projection at one end engaging said skirt between said rod and said peripheral projection to hold said sealing member in engagement with said retainer without additional clamping means, wherein said flange means is provided with a plurality of cutouts to permit flexure of said flange means to facilitate assembly of said ball in said retainer.

2. A sealed ball joint assembly as set forth in claim 1, wherein said sealing member further comprises rib means at an opposite end thereof disposed in sliding engagement with said shank and an intermediate flexible portion extending between said annular projection and said rib means.

3. A sealed ball joint assembly as set forth in claim 2, wherein said rib means is comprised of two spaced part tongues disposed in sliding engagement with said shank.

4. A sealed ball joint assembly as set forth in claim 1, wherein said skirt is provided with an annular recess between said rod and said peripheral projection, and said annular projection on said sealing member is provided with a rib which is received in said recess.

* * * * *